United States Patent Office 3,278,528
Patented Oct. 11, 1966

3,278,528
5α-HALO-4β,19-OXIDO STEROIDS AND PROCESS FOR PRODUCTION THEREOF
Albert Bowers, John Edwards, and Samuel Ladabaum, Mexico City, Mexico, assignors to Syntex Corporation, Panama, Panama, a corporation of Panama
No Drawing. Filed Dec. 20, 1962, Ser. No. 246,014
17 Claims. (Cl. 260—239.55)

The present invention relates to novel cyclopentanophenanthrene derivatives and to a process for the production thereof.

More particularly, the present invention relates to 5α-halo-4β,19-oxido-androstane, pregnane and spirostane derivatives, to a process for the production thereof and to a process for their conversion into Δ⁴-19-hydroxy-derivatives, of which the Δ⁴-3,19-dihydroxyandrostene derivatives are also an object of the present invention.

The compounds which are an object of the present invention are represented by the following formulae:

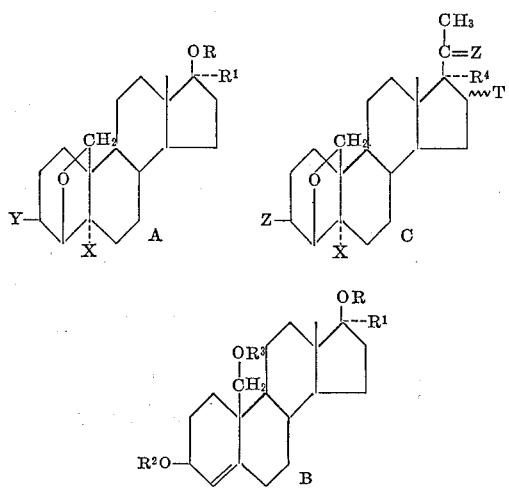

In the above formulae, X represents chlorine or bromine; Y represents hydrogen, keto, β-hydroxyl or a β-hydrocarbon carboxylic acyloxy group of less than 12 carbon atoms; Z represents keto, a β-hydroxyl group or a β-hydrocarbon carboxylic acyloxy group of less than 12 carbon atoms; R, R², and R³ each represent hydrogen or a hydrocarbon carboxylic acyl group of less than 12 carbon atoms; R¹ represents hydrogen or a lower hydrocarbon residue of up to 6 carbon atoms; R⁴ represents hydrogen, hydroxyl or a hydrocarbon carboxylic acyloxy group of less than 12 carbon atoms; T represents hydrogen, α-methyl or β-methyl; R⁴ and T together represents the group

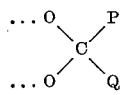

in the 16α,17α-positions, wherein P and Q each represent hydrogen or a lower hydrocarbon residue of less than 8 carbon atoms, which may be saturated or unsaturated, of straight, branched, cyclic or cyclic-aliphatic chain, or aromatic. Typical groups are methyl, ethyl, phenyl, methylphenyl, cyclohexyl, and the like.

The acyl and acyloxy groups are derived from hydrocarbon carboxylic acids containing less than 12 carbon atoms which may be saturated or unsaturated, of straight, branched, cyclic or cyclicaliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel compounds of the present invention represented by the above formulae A and B are anabolic-androgenic agents with a favorable anabolic-androgenic ratio. In addition, they have anti-estrogenic, anti-gonadotrophic, anti-fibrillatory and appetite stimulating properties. Furthermore, they lower the blood cholesterol level, relieve premenstrual tension and suppress the output of the pituitary gland.

The compounds represented by the above Formula C are powerful progestational agents. In addition they have anti-androgenic, anti-gonadotrophic and anti-estrogenic properties and are very useful in fertility control. Furthermore, they may be used in the treatment of premenstrual tension and exhibit blood cholestrol lowering and diuretic activities. When applied topically, these compounds are very useful in the treatment of acne.

The process for the production of 5α-halo-4β,19-oxido steroids, which is one of the objects of the present invention, is illustrated by the following equation:

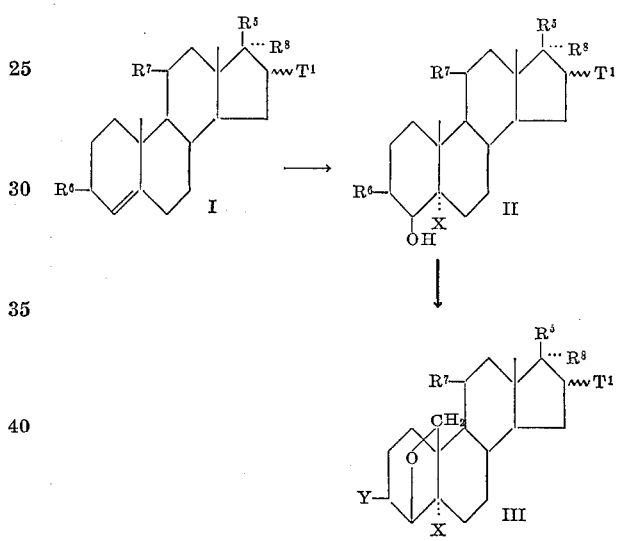

In the above formulae, X and Y have the same meaning as described hereinbefore; R⁵ represents hydroxyl, acyloxy, acetyl or 1'-acyloxy-ethyl(1'); R⁶ represents acyloxy or hydrogen; R⁷ represents hydrogen or keto; R⁸ represents hydrogen, a hydrocarbon carboxylic acyloxy group of less than 12 carbon atoms, a lower hydrocarbon residue of up to 6 carbon atoms or a hydroxyl group; T¹ represents hydrogen, α-methyl or β-methyl; R⁵ and R⁸ together represent keto, or the dihydroxy acetone side chain protected by the 17,20;20,21-bismethylenedioxy grouping; R⁸ and T¹ together represent the group

wherein P and Q have the same meaning as set forth hereinbefore; R⁵, R⁸, and T¹ together represent a sapogenin side chain.

The starting compound (I) of the process outlined above is selected from the group consisting of the androstane, pregnane and sapogenin series, having no substitution or an acyloxy substituent at C–3, an angular methyl group at C–10 and a double bond between C–4 and C–5. At C–17 there may be present a ketone, a 17β-acyloxy group, a 17β-acetyl group, a 1'-acyloxy-ethyl(1') group, or a 17α-lower hydrocarbon residue.

Other groups which do not interfere with the reactions of the above-illustrated process may also be present in the molecule of the starting compound, such as for example hydroxyl groups protected in the form of acylates or ketals in positions 7, 11, 12, 14, 15, 16, 17, or 18; ketone groups in the same positions; lower alkyl groups in positions 6, 7, 11, 12, 15, or 16, and/or other similar substituents.

Examples of starting compounds are the diacetate of $\Delta^4$-androstene-3$\beta$,17$\beta$-diol, the diacetate of $\Delta^4$-pregnene-3$\beta$,20$\beta$-diol, the diacetate of 16$\alpha$-methyl-$\Delta^4$-pregnene-3$\beta$,20$\beta$-diol, the diacetate of 16$\beta$-methyl-$\Delta^4$-pregnene-3$\beta$,20$\beta$-diol, the diacetate of 16$\alpha$,17$\alpha$-isopropylidenedioxy-$\Delta^4$-pregnene-3$\beta$,20$\beta$-diol, the acetate of 17,20;20,21-bismethylenedioxy-$\Delta^4$-pregnen-3$\beta$-ol, the acetate of 17,20; 20,21-bismethylenedioxy - $\Delta^4$ - pregnen-3$\beta$-ol-11-one, the acetate of $\Delta^4$-22a-spirosten-3$\beta$-ol, the diacetate of 17$\alpha$-methyl-$\Delta^4$-androstene-3$\beta$,17$\beta$-diol, the diacetate of 17$\alpha$-ethinyl-$\Delta^4$-androstene-3$\beta$,17$\beta$-diol, the triacetate of 16$\alpha$-methyl-$\Delta^4$-pregnene-3$\beta$,17$\alpha$,20$\beta$-triol, the acetate of $\Delta^4$-androsten-17$\beta$-ol, and the acetate of 17$\alpha$-methyl-$\Delta^4$-androsten-17$\beta$-ol.

In practicing the process outlined above, the starting compound (I) is treated with a hypohalous acid, preferably hypobromous or hypochlorous acid, obtained by reacting an N-chloro or bromo amide or imide, such as N-(chloro or bromo)acetamide, with a strong acid such as perchloric acid, or by treating an alkali metal or alkaline earth metal hypochlorite or hypobromite with an acid, such as acetic acid, thus affording the corresponding 5$\alpha$-(chloro or bromo)-4$\beta$-hydroxy derivative (II).

The 5$\alpha$-(chloro or bromo)-4$\beta$-hydroxy steroids are treated with a metal hydrocarbon carboxylic acylate of less than 12 carbon atoms, which on ionization produces a cation with a reduction potential larger than +0.3 v., with respect to its closest reduced state, and preferably larger than +0.7 v. [see Glasstone, "Textbook of Physical Chemistry," 2nd ed. (New York: D. Van Nostrand Co., Inc., 1952) pages 939, 940], as for example lead tetraacetate, lead tetrapropionate, mercuric diacetate, silver acetate, and the like, or with a positive halogen donor, in a non-polar solvent, thus affording the corresponding 5$\alpha$,-halo-4$\beta$,19-oxido steroids (III).

The positive halogen donor may belong to any of the following groups:

(a) An N-haloimide or N-haloamide of the type represented by the following formulae:

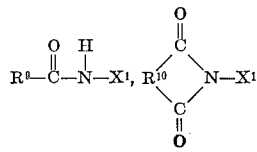

wherein $R^9$ represents a lower alkyl group; $R^{10}$ is an aromatic or aliphatic radical of less than 8 carbon atoms; $X^1$ represents a halogen of atomic weight greater than 19. Typical examples of N-haloimide or N-haloamide are: N-bromoacetamide, N-iodosuccinimide, N-bromosuccinimide, N-chlorosuccinimide, N-bromophthalimide and similar compounds.

(b) A compound of the type described in group (a) in the presence of iodine, thus improving in some cases the yields of the reaction.

(c) Lower alkyl hypohalites which may be prepared by the reaction of oxides such as mercuric oxide, silver oxide or lead oxide on the corresponding alcohols in the presence of a halogen of atomic weight greater than 19, preferably iodine.

(d) Hydrocarbon carboxylic acyl hypohalites of less than 12 carbon atoms, which may be prepared in situ by the action of a metal hydrocarbon carboxylic acylate of less than 12 carbon atoms which on ionization produces a cation with a reduction potential larger than +0.3, with respect to its closest reduced state, preferably larger than +0.7, on a halogen of atomic weight greater than 19, preferably iodine. Typical examples of metal acylates are lead tetraacetate, lead tetrapropionate, mercuric diacetate, silver acetate, mercuric dipropiontae, and the like.

The solvents which give best results in the present reaction are non-polar organic solvents free from active hydrogen atoms, such as the aromatic solvents, e.g. benzene, toluene or xylene, ethers, for example, ter-butyl-ether or dioxane, halogenated hydrocarbons, e.g., carbon tetrachloride, methylene chloride and the like.

This reaction is preferably carried out at reflux temperature for a period of time which may range from approximately 2 to 18 hours, being accelerated in some cases by irradiation with daylight, electric-lamp light and ultraviolet light.

The 5$\alpha$-halo-4$\beta$,19-oxido compounds having secondary acyloxy groups, e.g. in C–3, C–17 and/or C–20, may be conventionally hydrolyzed to the corresponding free alcohols, which in turn may be reacylated by usual procedures to give acylates different from the original ones, or may be oxidized under standard conditions, e.g. with Jones' reagent, to give the corresponding ketones.

The process for conversion of 5$\alpha$-halo-4$\beta$,19-oxido steroids into the corresponding $\Delta^4$-19-hydroxy derivatives is represented as follows:

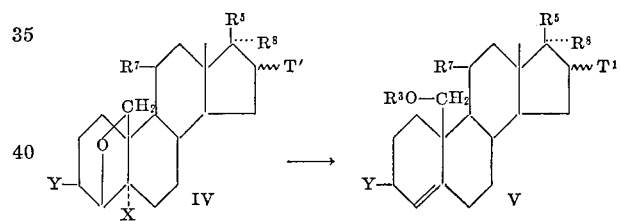

In the above formulae X, Y, $T^1$, $R^3$, $R^5$, $R^7$, and $R^8$ have the same meaning as set forth hereinbefore.

When practicing this process, the starting compound (IV) is treated with a reagent selected from the group consisting of metals having an oxidation potential between +3.045 and +0.126 volts, inclusive (measured at 25° C.) [see Hodgman, "Handbook of Chemistry and Physics," 41st ed., 1959–60 (Cleveland, Ohio: Chemical Rubber Publishing Co.) page 1733], salts which on ionization give cations having an oxidation potential between +0.61 and +0.25 volt, inclusive (loc. cit.), and metal iodides, preferably the iodides of alkali and alkali-earth metals, in an adequate solvent.

When carrying out the reaction with metals of oxidation potential higher than +1.5 volts, such as for example lithium, calcium, sodium, magnesium, etc., there are preferably employed solvents free from active hydrogen atoms, e.g.) aromatic solvents such as benzene, toluene or xylene, ethers such as ter-butyl ether or dioxane, halogenated hydrocarbons such as carbon tetrachloride, methylene chloride, etc.

When using metals with an oxidation potential lower than +1.5 volts, such as manganese or zinc, for example, there are preferably used lower aliphatic alcohols, such as methanol, ethanol or isopropanol, or liquid hydrocarbon carboxylic acids of less than 12 carbon atoms such as acetic acid, propionic acid etc. If the reagent employed is a salt, either a cation of adequate oxidation potential or a metal iodide, the reaction is preferably conducted in a polar organic solvent inert to such salts, such as for example the lower aliphatic ketones, such as acetone, or the lower aliphatic alcohols. Examples of salts with a cation of oxidation potential between +0.61 and +0.25 volt are chromous chloride, vanadium (ous) chloride, etc.

Examples of the metal iodides used in the present reaction are sodium iodide, potassium iodide, calcium iodide, etc.

The reaction can also be carried out with mixtures of a metal of oxidation potential between the limits set forth above and a metal of oxidation potential in the lower limit, such as for example the zinc-copper couple.

When a hydrocarbon carboxylic acid is used as a solvent for the reaction under the conditions set forth above, there are obtained the corresponding 19-acyloxy derivatives (V:$R^3$=acyl), wherein the acyloxy group is derived from the acid used as solvent. With the other solvents, there are obtained the corresponding free 19-alcohols (V:$R^3$=H).

The 3 and/or 19-acyloxy (V) compounds are conventionally saponified in a basic medium to the corresponding 3 and/or 19-hydroxy compounds (V:$R^3$=H).

The reaction conditions are not especially critical. Thus, for example, when treating a starting compound of the type set forth above with zinc dust in ethanol, the optimum reaction conditions are reflux temperature for an approximate time of 16 hours. However, the reaction may also be carried out at lower temperatures than reflux, for a period of time which may be shorter or longer, which only causes variations in the yield of the final product.

The intermediates described above may be converted into the corresponding 19-nor derivatives by the methods illustrated by the following equation, wherein only rings A and B are represented:

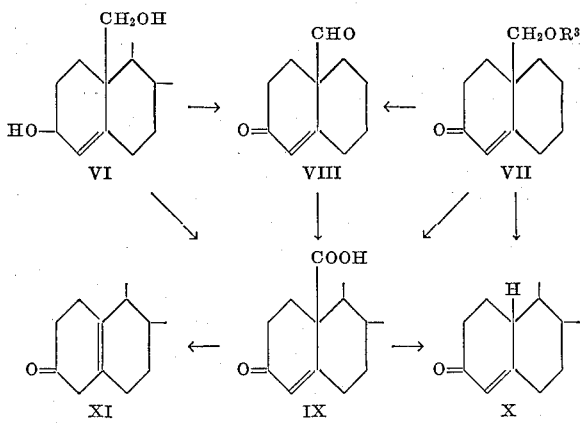

In the above formulae, $R^3$ has the same meaning set forth previously.

In accordance with the above equation, the $\Delta^4$-3,19-diols (VI) may be oxidized conventionally to give the corresponding $\Delta^4$-19-al-3-ones (VIII). The latter compounds may also be obtained by oxidizing the corresponding $\Delta^4$-19-ol-3-ones (VII:$R^3$=H), for example by the Oppenauer method or with chromium trioxide in pyridine.

The $\Delta^4$-19-al-3-ones (VIII), as well as the $\Delta^4$-19-ol-3-ones (VII:$R^3$=H), may be oxidized in almost quantitative yield to produce the corresponding $\Delta^4$-3-one-19-oic acids (IX), for example with Jones' reagent (8 N chromic acid in acetone solution).

The conversion of the $\Delta^4$-3-ketones with one or more oxygen atoms at C–19 (VII, VIII, IX) into the corresponding 19-nor derivatives is carried out by known procedures.

For example, the production of the 19-nor derivatives by alkaline treatment of 19-hydroxy or acyloxy-$\Delta^4$-3-ketones by alkaline treatment has been described by G. Winston Barber et al., J. Org. Chem., 20, 1253 (1955), A. S. Meyer, Experientia 11, 99 (1955), and A. Zaffaroni, British Patents Nos. 820,780 and 853,851, while the preparation of 19-nor derivatives from $\Delta^4$-19-al-3-ones by alkali treatment and from $\Delta^4$-3-keto-19-oic acids by acid treatment has been described by H. Hagiwara et al., Chem. Pharm. Bull. Japan, 8, 84 (1960).

In the latter reference, there is also described a method for producing $\Delta^{5(10)}$-3-ketones (XI) from $\Delta^4$-3-keto-19-oic acids by heating with pyridine.

The application of these processes to the intermediate compounds in the present invention makes possible the production of important 19-nor-derivatives, such as for example 19-nor-$\Delta^4$-androstene-3,17-dione, 19-nor-$\Delta^4$-androsten-17$\beta$-ol-3-one, 19-nor-progesterone, 19-nor-17$\alpha$-hydroxypropgesterone, etc., which in turn may serve as starting compounds for the preparation of other important 19-nor derivatives known to those skilled in the art.

The following specific examples serve to illustrate our invention, but are not intended to limit its scope.

PREPARATION 1

A solution of 1 g. of testosterone in 50 cc. of tetrahydrofuran was added over a 30 minute period to a stirred suspension of 1 g. of lithium aluminum hydride in 50 cc. of anhydrous tetrahydrofuran. The mixture was refluxed for 2 hours, then cooled and cautiously stirred with 5 cc. of ethyl acetate and 2 cc. of water. Solid sodium sulfate was added, and the inorganic material filtered off and thoroughly washed with hot ethyl acetate. The combined organic solutions, upon evaporation, yielded a crude material which was purified by crystallization from acetone-hexane, thus giving $\Delta^4$-androstene-3$\beta$,17$\beta$-diol.

By the same procedure, the compounds listed hereinafter under A were respectively converted into the products set forth under B:

| A | B |
|---|---|
| 17$\alpha$-methyl-testosterone | 17$\alpha$-methyl-$\Delta^4$-androstene-3$\beta$,17$\beta$-diol. |
| 17$\alpha$-ethinyl-testosterone | 17$\alpha$-ethinyl-$\Delta^4$-androstene-3$\beta$,17$\beta$-diol. |
| 16$\alpha$-methyl-17$\alpha$-hydroxy-progesterone. | 16$\alpha$-methyl-$\Delta^4$-pregnene-3$\beta$,17$\alpha$,20$\beta$-triol. |
| Progesterone | $\Delta^4$-Pregnene-3$\beta$,20$\beta$-diol. |
| 16$\alpha$-methyl-progesterone | 16$\alpha$-methyl-$\Delta^4$-pregnene-3$\beta$,20$\beta$-diol. |
| 16$\beta$-methyl-progesterone | 16$\beta$-methyl-$\Delta^4$-pregnene-3$\beta$,20$\beta$-diol. |
| 16$\alpha$,17$\alpha$-isopropylidenedioxy-$\Delta^4$-pregnene-3,20-dione. | 16$\alpha$,17$\alpha$-isopropylidenedioxy-$\Delta^4$-pregnene-3$\beta$,20$\beta$-diol. |
| 17,20;20,21-bismethylene-dioxy-$\Delta^4$-pregnene-3,11-dione. | 17,20;20,21-bismethylenedioxy-$\Delta^4$-pregnene-3$\beta$,11$\beta$-diol. |
| 17,20;20,21-bismethylene-dioxy $\Delta^4$ pregnen-3-one. | 17,20;20,21-bismethylenedioxy-$\Delta^4$-pregnen-3$\beta$-ol. |
| diosgenone | $\Delta^4$-22a-spirosten-3$\beta$-ol. |

PREPARATION 2

A mixture of 1 g. of $\Delta^4$-androstene-3$\beta$,17$\beta$-diol, 4 cc. of pyridine and 2 cc. of acetic anhydride was kept at room temperature overnight, then poured into ice water. The thus-formed precipitate was filtered, washed with water and dried. Crystallization from acetone-hexane gave the diacetate of $\Delta^4$-androstene-3$\beta$,17$\beta$-diol.

The compounds listed hereinafter under A were treated by the same procedure to give, respectively, the products set forth under B:

| A | B |
|---|---|
| $\Delta^4$-pregnene-3$\beta$,20$\beta$-diol | The diacetate of $\Delta^4$-pregnene-3$\beta$,20$\beta$-diol. |
| 16$\alpha$-methyl-$\Delta^4$-pregnene-3$\beta$,20$\beta$-diol | The diacetate of 16$\alpha$-methyl-$\Delta^4$-pregnene-3$\beta$,20$\beta$-diol. |
| 16$\beta$-methyl-$\Delta^4$-pregnene-3$\beta$,20$\beta$-diol | The diacetate of 16$\beta$-methyl-$\beta^4$-pregnene-3$\beta$,20$\beta$-diol. |
| 16$\alpha$,17$\alpha$-isopropylidenedioxy-$\Delta^4$-pregnene-3$\beta$,20$\beta$-diol. | The diacetate of 16$\alpha$,17$\alpha$-isopropylidenedioxy-$\Delta^4$-pregnene-3$\beta$,20$\beta$-diol. |
| 17,20;20,21-bismethylene-dioxy-$\Delta^4$-pregnene-3$\beta$,11$\beta$-diol. | The 3-acetate of 17,20;20,21-bismethylenedioxy-$\Delta^4$-pregnene-3$\beta$,11$\beta$-diol. |
| 17,20;20,21-bismethylene-dioxy-$\Delta^4$-pregnen-3$\beta$-ol. | The acetate of 17,20;20,21-bismethylenedioxy-$\Delta^4$-pregnen-3$\beta$-ol. |
| $\Delta$-22a-spirosten-3$\beta$-ol | The acetate of $\Delta^4$-22a-spirosten-3$\beta$-ol. |

PREPARATION 3

To a solution of 5 g. of 17α-methyl-Δ⁴-androstene-3β,17β-diol in 100 cc. of anhydrous benzene there were added 1 g. of p-toluenesulfonic acid and 10 cc. of acetic anhydride, and the mixture was then allowed to stand for 24 hours at room temperature. Next, it was poured into ice and water and the resulting mixture stirred to effect hydrolysis of the excess anhydride. The benzene layer was separated and washed with 10% sodium carbonate solution and water. Drying, evaporation and crystallization of the residue from ether-hexane produced the diacetate of 17α-methyl-Δ⁴-androstene-3β,17β-diol.

Following the same procedure, 17a-ethinyl-Δ⁴-androstene-3β,17β-diol and 16α-methyl-Δ⁴-pregnene-3β,17α,20β-triol were treated to give, respectively, the diacetate of 17α-ethinyl-Δ⁴androstene-3β,17β-diol and the triacetate of 16α-methyl-Δ⁴-pregnene-3β,17α,20β-triol.

PREPARATION 4

A solution of 1 g. of 17,20;20,21-bismethylenedioxy-Δ⁴-pregnene-3β,11β-diol 3-acetate in 10 cc. of acetone was cooled to 0° C. and treated under an atmosphere of nitrogen, with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and then diluted with water. The precipitate was collected, washed with water and dried under vacuum, thus affording a crude product which, upon recrystallization from acetone-hexane, gave 17,20;20,21-bismethylenedioxy-Δ⁴-pregnen-3β-ol-11-one acetate.

PREPARATION 5

A solution of 5 g. of testosterone in 100 cc. of glacial acetic acid containing 5 cc. of ethane dithiol and 4 cc. of a saturated solution of hydrogen chloride in acetic acid was allowed to stand at room temperature for 4 hours. Water was then added and the resulting mixture was saturated with ethyl acetate. The extract was washed with a 5% aqueous sodium bicarbonate solution and then with water, dried over sodium sulfate and evaporated to dryness. Recrystallization from ether-hexane afforded the cycloethylene dithioketal of testosterone.

A solution of 4 g. of the latter compound in 3 lt. of ethanol (previously distilled over Raney nickel) was boiled under reflux for 6 hours with 50 g. of Raney nickel. The metal was there removed by filtration and washed with hot ethanol. The filtrate was evaporated to dryness, the residue dissolved in chloroform and washed with dilute hydrochloric acid, then with sodium carbonate solution and finally with water. Drying, evaporation and crystallization of the residue from acetone-hexane furnished Δ⁴-androsten-17β-ol.

In the same manner 17α-methyl-testosterone afforded 17α-methyl-Δ⁴-androsten-17β-ol.

Δ⁴-androsten-17β-ol was treated according to Preparation 2 to produce Δ⁴-androsten-17β-ol acetate.

17α-methyl-Δ⁴-androstan-17β-ol was treated according to Preparation 3 to give 17α-methyl-Δ⁴-androsten-17β-ol acetate.

PREPARATION 6

A mixture of 1 g. of Δ⁴-pregnene-3β,20β-diol in 20 cc. of dioxane and 1.1 molar equivalents of 2,3-dichloro-5,6-dicyano-1,4-benzoquinone was kept at room temperature for 3 hours. The hydroquinone formed during the reaction was filtered off, and the filtrated evaporated to dryness. The residue was dissolved in acetone and filtered through 20 g. of alumino. Crystallization from acetone-hexane gave Δ⁴-pregnen-20β-ol-3-one.

The latter compound was treated according to Preparation 5, thus giving Δ⁴-pregnen-20β-ol, which was treated according to Preparations 2 and 4, giving respectively Δ⁴-pregnen-20β-ol acetate and Δ⁴-pregnen-20-one.

Example I

Ten g. of the diacetate of Δ⁴-androstene-3β,17β-diol were suspended in 100 cc. of dioxane. Next, 12 cc. of 0.46 N perchloric acid were added and then 4 g. of N-bromoacetamide (the N-bromoacetamide was added little by little, with stirring, over a period of 1 hour in the absence of light and at a temperature of about 15° C.). Then, stirring was continued for 1 hour in darkness and at room temperature, following which the mixture was decolorized by the addition of a 10% aqueous sodium bisulfite solution. Next 1 liter of water was added and the mixture was extracted with methylene chloride. The extract was washed with water, dried over anhydrous sodium sulfate and the solvent was evaporated, under reduced pressure and at room temperature, thus giving 5α-bromo-androstane-3β,4β,17β-triol 3,17-diacetate.

Example II

A mixture of 5 g. of the diacetate of Δ⁴-androstene-3β,17β-diol, 65 cc. of ether, 8 g. of calcium chlorohypochlorite, 300 cc. of water and 6.1 cc. of glacial acetic acid was stirred at 25° C. for 30 minutes. Water was added, and the organic layer was diluted with more ether and separated. Then it was washed at low temperature with sodium bicarbonate solution, then with water, dried and evaporated to dryness. The residue was chromatographed on neutral alumina, thus affording 5α-chloro-androstane-3β,4β,17β-triol 3,17-diacetate.

Example III

To a solution of 4 g. of the 3,17-diacetate of 5α-bromo-androstane-3β,4β,17β-triol in 150 cc. of dry benzene there was added 6 g. of lead tetraacetate, and the miture was refluxed for 18 hours. It was then cooled, filtered, water was added to the filtrate, the benzene layer was separated, washed with water and the benzene was evaporated under reduced pressure. Upon chromatography of the residue on neutral alumina there was obtained the diacetate of 5α-bromo-4β,19-oxido androstane-3β,17β-diol.

Example IV

A suspension of 2 g. of calcium carbonate, 6 g. of dry lead tetraacetate and 1.6 g. of iodine in 200 cc. of cyclohexane was refluxed for 30 minutes in darkness. There was then added 1 g. of the 3,17-diacetate of 5α-bromo-androstane-3β,4β,17β-triol and the resulting mixture was allowed to boil under reflux for a further 3 hours in daylight. The reaction mixture was then cooled, filtered, and the filtrate was washed successively with a 10% aqueous sodium thiosulfate solution and water, dried over anhydrous sodium sulfate and evaporated to dryness. The residue was chromatographed on neutral alumina, thus affording the diacetate of 5α-bromo-4β,19-oxido, androstane-3β,17β-diol.

Example V

Example III was repeated, except that lead tetraacetate was substituted by mercuric diacetate, thus affording the same compound as the one obtained in said example.

Example VI

The technique described in Example III was modified in that silver acetate was used instead of lead tetraacetate, thus yielding a compound identical with the one obtained in said example.

Example VII

The 3,17-diacetate of 5α-bromo-androstane-3β,4β,17β-triol was treated in accordance with Example IV, except that lead tetraacetate was substituted by mercuric diacetate in one experiment, and by silver acetate in a second experiment, giving in each case the diacetate of 5α-bromo-4β,19-oxido-androstane-3β,17β-diol.

Example VIII

The technique described in Example III was repeated with the exception that benzene was substituted by carbon tetrachloride, thus giving a compound identical with the one obtained in said example.

Example IX

The procedure of Example IV was repeated except that daylight was substituted by light from a 500 watt tungsten lamp. Three g. of calcium carbonate were added to the reaction mixture, and the reaction time was diminished to 2 hours. This gave a compound identical with the one obtained in said example.

Example X

A mixture of 3 g. of calcium carbonate, 5 g. of N-iodosuccinimide, 3 g. of iodine, 2.5 g. of the 3,17-diacetate of 5α-bromo-androstane, 3β,4β,17β-triol and 200 cc. of cyclohexane, was refluxed for 1 hour under irradiation with a 500 watt electric lamp, then 5 g. of N-iodo-succinimide were added and refluxing was continued for 2 hours. The reaction mixture was thereafter filtered and the filtrate washed successively with an aqueous solution of potassium iodide, an aqueous solution of sodium thiosulfate, and water, then dried over anhydrous sodium sulfate and evaporated to dryness under vacuum. The residue was chromatographed on alumina, thus furnishing the diacetate of 5α-bromo-4β,19-oxido-androstane-3β,17β-diol.

Example XI

The procedure of Example X was repeated under exactly the same conditions, except that N-bromoacetamide was used instead of N-iodo-succinimide, giving a compound identical with the one obtained in said example.

Example XII

The 3,17-diacetate of 5α-bromo-androstane-3β,4β,17β-triol was treated following the procedure of Example X with the exception that no iodine was added, thus affording the diacetate of 5α-bromo-4β,19-oxido-androstane-3β,17β-diol.

Example XIII

A mixture of 5 g. of the diacetate of 5α-bromo-4β,19-oxido-androstane-3β,17β-diol, 25 g. of zinc dust and 400 cc. of glacial acetic acid was refluxed under stirring for 16 hours, at the end of which time the mixture was filtered through celite. The filtrate was concentrated to a small volume under reduced pressure, cooled and diluted with ice water to precipitate the crude product. Recrystallization from acetone-hexane furnished the triacetate of $\Delta^4$-androstene-3β,17β,19-triol.

Example XIV

A mixture of 1 g. of the diacetate of 5α-bromo-4β,19-oxido-androstane-3β,17β-diol, 5 g. of zinc dust and 50 cc. of ethanol was refluxed for 16 hours and then filtered through celite. The filtrate was evaporated to dryness and the residue crystallized from acetone-hexane, thus yielding the 3,17-diacetate of $\Delta^4$-androstene-3β,17β-19-triol.

Example XV

A mixture of 5 g. of the diacetate of 5α-bromo-4β,19-oxido-androstane-3β,17β-diol, 10 g. of zinc dust and 350 cc. of glacial acetic acid was refluxed for 20 hours under vigorous stirring. The mixture was then worked up by the process described in Example XIII, thus affording the triacetate of $\Delta^4$-androstene-3β,17β,19-triol.

Example XVI

A mixture of 1 g. of the diacetate of 5α-bromo-4β,19-oxido-androstane-3β,17β-diol, 6 g. of zinc and 50 cc. of ethanol was refluxed for 12 hours, then filtered through celite and the filtrate was poured into water. The precipitate formed was collected by filtration, washed with water and dried. Recrystallization from acetone-hexane afforded the 3,17-diacetate of $\Delta^4$-androstene-3β,17β,19-triol.

Example XVII

To 2 g. of the diacetate of 5α-bromo-4β,19-oxido-androstane-3β,17β-diol in 100 cc. of benzene was added a mixture of 5 g. of finely divided sodium metal and 200 cc. of benzene, and the resulting mixture was refluxed under an atmosphere of nitrogen for 24 hours. The excess of sodium was cautiously removed by filtration and the solution was treated with 5 cc. of methanol and then with water.

The organic layer was separated, dried and evaporated to dryness under reduced pressure. The residue was crystallized from methanol-benzene, thus giving the 3,17-diacetate of $\Delta^4$-androstene-3β,17β,19-triol.

Example XVIII

The diacetate of 5α-bromo-4β,19-oxido-androstane-3β,17β-diol was treated by the method described in the preceding example, except, that the sodium metal was substituted by lithium metal, thus affording a product identical with the one obtained in said example.

Example XIX

The diacetate of 5α-bromo-4β,19-oxido-androstane-3β,17β-diol was treated in the same manner as in Example XVII except that calcium metal was used instead of sodium metal, thus affording a product identical with the one obtained in said example.

Example XX

The diacetate of 5α-bromo-4β,19-oxido-androstane-3β,17β-diol was treated by the method described in Example XVII except that the sodium metal was substituted by magnesium metal, thus giving a product identical with the one obtained in said example.

Example XXI

The diacetate of 5α-bromo-4β,19-oxido-androstane-3β,17β-diol was treated in accordance with the method of Example XIV, except that the zinc was substituted by manganese, thus obtaining a product identical with the one obtained in said example.

Example XXII

The diacetate of 5α-bromo-4β,19-oxido-androstane-3β,17β-diol was treated in accordance with the method of Example XVII, except that the benzene was substituted by xylene, thus giving the same product.

Example XXIII

The diacetate of 5α-bromo-4β,19-oxido-androstane-3β,17β-diol was treated in accordance with the method of Example XVII, except that the benzene was substituted by terbutyl ether, thus giving the same product as in said example.

Example XXIV

The diacetate of 5α-bromo-4β,19-oxido-androstane-3β,17β-diol was treated in accordance with the method of Example XVII, except that the benzene was substituted by carbon tetrachloride, thus affording the same product.

Example XXV

The starting compound of Example XIII was treated in accordance with the method described in that example, except that the acetic acid was substituted by propionic acid, thus giving the 3,17-diacetate-19-propionate of $\Delta^4$-androstene-3β,17β,19-triol.

Example XXVI

The starting compound of Example XIV was treated by the process described in that example, except that the ethanol was substituted by methanol, thus giving the same product.

Example XXVII

The starting compound of Example XIV was treated in accordance with the method of that example, except that instead of zinc dust there was employed zinc-copper dust. This reagent was prepared by suspending 5 g. of zinc dust in a solution of 3 g. of copper sulfate in 200 cc. of water. The powder formed was used for the reaction, which yielded a product identical with the one obtained in the aforementioned example.

Example XXVIII

To a solution of 1 g. of the diacetate of 5α-bromo-4β, 19-oxido-androstane-3β,17β-diol in 200 cc. of acetone was added at room temperature, under an atmosphere of nitrogen, 60 cc. of a recently prepared solution of chromous chloride (Rosenkranz et al., J. Am. Chem. Soc., 72, 4077 (1950)). After 5 minutes the acetone was removed under reduced pressure, water was added and the precipitate was collected and dried. Recrystallization from acetone-hexane afforded the 3,17-diacetate of Δ⁴-androstene-3β,17β,19-triol.

Example XXIX

To a solution of 3 g. of the diacetate of 5α-bromo-4β, 19-oxido-androstane-3β,17β-diol in 100 cc. of acetone there was added, at room temperature under an atmosphere of nitrogen, 5 g. of vanadium (ous) chloride in 200 cc. of acetone. The mixture was kept under the same conditions for 2 hours, then diluted with water and the acetone was evaporated under reduced pressure; the resulting solid was collected, washed with water and dried. By recrystallization from acetone-hexane there was obtained the 3,17-diacetate of Δ⁴-androstene-3β,17β,19-triol.

Example XXX

A mixture of 2 g. of the diacetate of 5α-bromo-4β,19-oxido-androstane-3β,17β-diol, 2 g. of sodium iodide and 50 cc. of methylethyl ketone was refluxed for 8 hours, then cooled, poured into water and extracted with ethyl acetate. The organic extract was dried over anhydrous sodium sulfate and evaporated to dryness. By crystallization of the residue from acetone-hexane there was obtained the 3,17-diacetate of Δ⁴-androstene-3β,17β,19-triol.

Example XXXI

The starting compound of the preceding example was treated by the method described in said example, except that the sodium iodide was substituted by potassium iodide, thus giving the same product.

Example XXXII

The starting compound of Example XXX, was treated by the method described in that example, but calcium iodide was used intsead of sodium iodide, thus giving the same product.

Example XXXIII

The 3,17-diacetate of 5α-chloro-androstane-3β,4β,17β-triol was treated according to Examples III and IV, affording in both cases the diacetate of 5α-chloro-4β,19-oxido-androstane-3β,17β-diol.

Example XXXIV

The diacetate of 5α-chloro-4β,19-oxido-androstane-3β,17β-diol was treated according to Examples XIII, XIV, XVII, XXVIII, XXIX and XXX, affording, in each case, a compound identical with the one obtained in the corresponding example.

Example XXXV

The starting compounds listed hereinafter under A were treated according to Example I, thus affording the corresponding products set forth under B:

| A | B |
|---|---|
| The diacetate of Δ⁴-pregnene-3β, 20β-diol. | The 3,20-diacetate of 5α-bromo-pregnane-3β, 4β, 20β-triol. |
| The diacetate of 16α-methyl-Δ⁴-pregnene-3β, 20β-diol. | The 3,20-diacetate of 5α-bromo-16α-methyl-pregnane-3β-4β,20β-triol. |
| The diacetate of 16β-methyl-Δ⁴-pregnene-3β,20β-diol. | The 3,20-diacetate of 5α-bromo-16β-methyl-pregnane-3β-4β, 20β-triol. |
| The diacetate of 16α, 17α-isopropylidenedioxyl-Δ⁴-pregnene-3β- 20β-diol. | The 3,20-diacetate of 5α-bromo-16α, 17α-isopropylidenedioxy-pregnane-3β,4β,20β-triol. |
| The acetate of 17, 20;20, 21-bismethylenedioxy-Δ⁴-pregnen-3β-ol. | The 3-acetate of 5α-bromo-17, 20;20, 21-bismethylenedioxy-pregnane-3β,4β-diol. |
| The acetate of 17, 20;20, 21-bismethylenedioxy-Δ⁴-pregnen-3β-ol-11-one. | The 3-acetate of 5α-bromo-17, 20;20, 21-bismethylenedioxy-pregnane-3β, 4β-diol-11-one. |
| The acetate of Δ⁴-22a-spirosten-3β-ol. | The 3-acetate of 5α-bromo-22a-spirostane-3β,4β-diol. |
| The diacetate of 17α-methyl-Δ⁴-androstene-3β,17β-diol. | The 3,17-diacetate of 5α-bromo-17α-methyl-androstane-3β,4β, 17β-triol. |
| The diacetate of 17α-ethinyl-Δ⁴-androstene-3β,17β-diol. | The 3,17-diacetate of 5α-bromo-17α-ethinyl-androstane-3β,4β, 17β-triol. |
| The triacetate of 16α-methyl-Δ⁴-pregnene-3β-17α, 20β-triol. | The 3,17,20-triacetate of 5α-bromo-16α-methyl-pregnane-3β,4β, 11α, 20β-tetrol. |
| The acetate of Δ⁴-androsten-17β-ol. | The 17-acetate of 5α-bromo-androstane-4β,17β-diol. |
| The acetate of 17α-methyl-Δ⁴-androsten-17β-ol. | The 17-acetate of 5α-bromo-17α-methyl-androstane-4β,17β-diol. |

Example XXXVI

The starting compounds listed under A in Example XXXV were treated according to Example II, thus affording respectively:

The 3,20-diacetate of 5α-chloro-pregnane-3β,4β,20β-triol,

The 3,20-diacetate of 5α-chloro-16α-methyl-pregnane-3β,4β,20β-triol,

The 3,20-diacetate of 5α-chloro-16β-methyl-pregnane-3β,4β,20β-triol,

The 3,20-diacetate of 5α-chloro-16α,17α-isopropylidenedioxy-pregnane-3β,4β,20β-triol, The 3-acetate of 5α-chloro-17,20;20,21-bismethylenedioxy-pregnane-3β,4β-diol, The 3-acetate of 5α-chloro-17,20;20,21-bismethylenedioxy-pregnane-3β,4β-diol-11-one, The 3-acetate of 5α-chloro-22a-spirostane-3β,4β-diol, The 3,17-diacetate of 5α-chloro-17α-methyl-androstane-3β,4β,17β-triol, The 3,17-diacetate of 5α-chloro-17α-ethinyl-androstane-3β,4β,17β-triol, The 3,17,20-triacetate of 5α-chloro-16α-methyl-pregnane-3β,4β,17α,20β-tetrol, The 17-acetate of 5α-chloro-androstane-4β,17β-diol, The 17-acetate of 5α-chloro-17α-methyl-androstane-4β,17β-diol.

Example XXXVII

The final compounds of Example XXXV were treated according to Example IV, thus furnishing respectively:

The diacetate of 5α-bromo-4β,19-oxido-pregnane-3β,20β-diol,

The diacetate of 5α-bromo-4β,19-oxido-16α-methyl-pregnane-3β,20β-diol,

The diacetate of 5α-bromo-4β,19-oxido-16β-methyl-pregnane-3β,20β-diol,

The diacetate of 5α-bromo-4β,19-oxido-16α,17α-isopropylidenedioxy-pregnane-3β,20β-diol, The acetate of 5α-bromo-4β,19-oxido-17,20;20,21-bismethylenedioxy-pregnan-3β-ol, The acetate of 5α-bromo-4β,19-oxido-17,20;20,21-bismethylenedioxy-pregnan-3β-ol-11-one, The acetate of 5α-bromo-4β,19-oxido-22a-spirostan-3β-ol, The diacetate of 5α-bromo-4β,19-oxido-17α-methyl-androstane-3β,17β-diol, The diacetate of 5α-bromo-4β,19-oxido-17α-ethinyl-androstane-3β,17β-diol,
The triacetate of 5α-bromo-4β,19-oxido-16α-methyl-pregnane-3β,17α,20β-triol,
The acetate of 5α-bromo-4β,19-oxido-androstan-17β-ol,
The acetate of 5α-bromo-4β,19-oxido-17α-methyl-androstan-17β-ol.

*Example XXXVIII*

The final compounds of Example XXXVI were treated according to Example IV, thus furnishing respectively:

The diacetate of 5α-chloro-4β,19-oxido-pregnane-3β,20β-diol,
The diacetate of 5α-chloro-4β,19-oxido-16α-methyl-pregnane-3β,20β-diol,
The diacetate of 5α-chloro-4β,19-oxido-16β-methyl-pregnane-3β,20β-diol,
The diacetate of 5α-chloro-4β,19-oxido-16α,17α-isopropylidenedioxy-pregnane-3β,20β-diol,
The acetate of 5α-chloro-4β,19-oxido-17,20;20,21-bismethylenedioxy-pregnan-3β-ol,
The acetate of 5α-chloro-4β,19-oxido-17,20;20,21-bismethylenedioxy-pregnan-3β-ol-11-one,
The acetate of 5α-chloro-4β,19-oxido-22a-spirostan-3β-ol,
The diacetate of 5α-chloro-4β,19-oxido-17α-methyl-androstane-3β,17β-diol,
The diacetate of 5α-chloro-4β,19-oxido-17α-ethinyl-androstane-3β,17β-diol,
The triacetate of 5α-chloro-4β,19-oxido-16α-methyl-pregnane-3β,17α,20β-triol,
The acetate of 5α-chloro-4β,19-oxido-androstan-17β-ol,
The acetate of 5α-chloro-4β,19-oxido-17α-methyl-androstan-17β-ol.

*Example XXXIX*

The final compounds of Example XXXVII were treated according to Example XIV, thus giving respectively:

The 3,20-diacetate of Δ⁴-pregnene-3β,19,20β-triol,
The 3,20-diacetate of 16α-methyl-Δ⁴-pregnene-3β,19,20β-triol,
The 3,20-diacetate of 16β-methyl-Δ⁴-pregnene-3β,19,20β-triol,
The 3,20-diacetate of 16α,17α-isopropylidenedioxy-Δ⁴-pregnene-3β,19,20β-triol,
The 3-acetate of 17,20;20,21-bismethylenedioxy-Δ⁴-pregnene-3β,19-diol,
The 3-acetate of 17,20;20,21-bismethylenedioxy-Δ⁴-pregnene-3β,19-diol-11-one,
The 3-acetate of Δ⁴-22a-spirostene-3β,19-diol,
The 3,17-diacetate of 17α-methyl-Δ⁴-androstene-3β,17β,19-triol,
The 3,17-diacetate of 17α-ethinyl-Δ⁴-androstene-3β,17β,19-triol,
The 3,17,20-triacetate of 16α-methyl-Δ⁴-pregnene-3β,17α,19,20β-tetrol,
The 17-acetate of Δ⁴-androstene-17β,19-diol,
The 17-acetate of 17α-methyl-Δ⁴-androstene-17β,19-diol,

*Example XL*

The final compounds of Example XXXVIII were treated according to Example XIV, thus affording, respectively, exactly the same compounds as set forth in Example XXXIX.

*Example XLI*

A solution of 2 g. of the diacetate of 5α-bromo-4β,19-oxido-androstane-3β,17β-diol in 50 cc. of methanol was treated with 5 cc. of a 4% aqueous potassium hydroxide solution and the reaction mixture was stirred at 0° C. for 1 hour under nitrogen atmosphere. The mixture was then neutralized with acetic acid and the methanol was distilled under reduced pressure.

The residue was triturated with water and the solid was collected, washed with water, dried and crystallized from ethyl acetate-methanol, thus yielding 5α-bromo-4β,19-oxido-androstane-3β,17β-diol.

*Example XLII*

A solution of 2 g. of 5α-bromo-4β,19-oxido-androstane-3β,17β-diol in 20 cc. of acetone was cooled to 0° C. and treated, under an atmosphere of nitrogen with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 5 minutes further at 0–5° C. and diluted with water. The precipitate was collected, washed with water and dried under vacuum, thus affording a crude product which upon recrystallization from acetone-hexane gave 5α-bromo-4β,19-oxide-androstane-3,17-dione.

*Example XLIII*

The first 11 final compounds of Example XXXVII were treated in accordance with Example XLI, thus yielding respectively:

5α-bromo-4β,19-oxido-pregnane-3β,20β-diol,
5α-bromo-4β,19-oxido-16α-methyl-pregnane-3β,20β-diol,
5α-bromo-4β,19-oxido-16β-methyl-pregnane-3β,20β-diol,
5α-bromo-4β,19-oxido-16α,17α-isopropylidenedioxy-pregnane-3β,20β-diol,
5α-bromo-4β,19-oxido-17,20;20,21-bismethylenedioxy-pregnan-3β-ol,
5α-bromo-4β,19-oxido-17,20;20,21-bismethylenedioxy-pregnan-3β-ol-11-one,
5α-bromo-4β,19-oxido-22a-spirostan-3β-ol,
The 17-acetate of 5α-bromo-4β,19-oxido-17α-methyl-androstane-3β,17β-diol,
The 17-acetate of 5α-bromo-4β,19-oxido-17α-ethinyl-androstane-3β,17β-diol,
The 17-acetate of 5α-bromo-4β,19-oxido-16α-methyl-pregnane-3β,17α,20β,triol,
The 17-acetate of 5α-bromo-4β,19-oxido-androstan-17β-ol.

*Example XLIV*

The final compounds of Example XLIII were treated according to Example XLII, thus giving respectively:

5α-bromo-4β,19-oxido-pregnane-3,20-dione,
5α-bromo-4β,19-oxido-16α-methyl-pregnane-3,20-dione,
5α-bromo-4β,19-oxido-16β-methyl-pregnane-3,20-dione,
5α-bromo-4β,19-oxido-16α,17α-isopropylidenedioxy-pregnane-3,20-dione
5α-bromo-4β,19-oxido-17,20;20,21-bismethylenedioxy-pregnan-3-one,
5α-bromo-4β,19-oxido-17,20;20,21-bismethylenedioxy-pregnane-3,11-dione,
5α-bromo-4β,19-oxido-22a-spirostan-3-one,
The acetate of 5α-bromo-4β,19-oxido-17α-methyl-androstan-17β-ol-3-one,
The acetate of 5α-bromo-4β,19-oxido-17α-ethinyl-androstan-17β-ol-3-one,
The acetate of 5α-bromo-4β,19-oxido-16α-methyl-pregnan-17α-ol-3,20-dione,
5α-bromo-4β,19-oxido-androstan-17-one.

*Example XLV*

A mixture of 1 g. of 5α-bromo-4β,19-oxido-androstane-3β,17β-diol, 4 cc. of pyridine and 2 cc. of caproic anhydride was kept at room temperature overnight and then poured into ice water. The thus formed precipitate was filtered, washed with water and dried. Crystallization from acetone-hexane gave the dicaporate of 5α-bromo-4β,19-oxido-androstane-3β,17β-diol.

By the same procedure, the final compounds of Example XLIII were respectively converted into:

The dicaproate of 5α-bromo-4β,19-oxido-pregnane-3β,20β-diol,
The dicaproate of 5α-bromo-4β,19-oxido-16α-methyl-pregnane-3β,20β-diol,
The dicaproate of 5α-bromo-4β,19-oxido-16β-methyl-pregnane-3β,20β-diol,

15

The dicaproate of 5α-bromo-4β,19-oxido-16α,17α-isopropylidenedioxy-pregnane-3β,20β-diol, The caproate of 5α-bromo-4β,19-oxido-17,20;20,21-bismethylenedioxy-pregnan-3βol, The caproate of 5α-bromo-4β,19-oxido-17,20;20,21-bismethylenedioxy-pregnan-3β-ol-11-one, The caproate of 5α-bromo-4β,19-oxido-22a-spirostan-3β-ol, The 3-caproate-17-acetate of 5α-bromo-4β,19-oxido-17α-methyl-androstan-3β,17β-diol, The 3-caproate-17-acetate of 5α-bromo-4β,19-oxido-17α-ethinyl-androstane-3β,17β-diol, The 3,20-dicaproate-17-acetate of 5α-bromo-4β,19-oxido-16α-methyl-pregnane-3β,17α,20β-triol, The caproate of 5α-bromo-4β,19-oxido-androstan-17β-ol.

Example XLVI

5α-bromo-4β,19-oxido-androstane-3,17-dione was treated according to Example XIV, thus giving Δ⁴-androsten-19-ol-3,17-dione.

Example XLVII

5α-bromo-4β,19-oxido-pregnane-3,20-dione was treated in accordance with Example XIV, to give Δ⁴-pregnen-19-ol-3,20-dione.

Example XLVIII

A solution of 0.17 g. of potassium hydroxide in 0.2 cc. of water and 2.5 cc. of methanol was added over 30 minutes to a boiling solution of 1 g. of the 3,17-diacetate of Δ⁴-androstene-3β,17β,19-triol in 30 cc. of methanol under an atmosphere of nitrogen. Boiling was continued for a further 2 hours and the solution was then cooled, neutralized with acetic acid and concentrated under reduced pressure. Addition of water, followed by crystallization of the precipitated solid from acetone-hexane, produced Δ⁴-androstene-3β,17β,19-triol.

The final compounds of Example XXXIX were treated according to the above procedure, thus affording respectively:

Δ⁴-pregnene-3β,19,20β-triol,
16α-methyl-Δ⁴-pregnene-3β,19,20β-triol,
16β-methyl-Δ⁴-pregnene-3β,19,20β-triol,
16α,17α-isopropylidenedioxy-Δ⁴-pregnene-3β,19,20β-triol,
17,20;20,21-bismethylenedioxy-Δ⁴-pregnene-3β,19-diol,
17,20;20,21-bismethylenedioxy-Δ⁴-pregnene-3β,19-diol-11-one,
Δ⁴-22a-spirostene-3β,19-diol,
17α-methyl-Δ⁴-androstene-3β,17β,19-triol,
17α-ethinyl-Δ⁴-androstene-3β,17β,19-triol,
16α-methyl-Δ⁴-pregnene-3β,17α,19,20β-tetrol,
Δ⁴-androstene-17β,19-diol,
17α-methyl-Δ⁴-androstene-17β,19-diol.

Example XLIX

The final compounds of Example XLVIII were treated according to Example XLV, thus yielding respectively:

The tricaproate of Δ⁴-androstene-3β,17β,19-triol,
The tricaproate of Δ⁴-pregnene-3β,19,20β-triol,
The tricaproate of 16α-methyl-Δ⁴-pregnene-3β,19,20β-triol,
The tricaproate of 16β-methyl-Δ⁴-pregnene-3β,19,20β-triol,
The tricaproate of 16α,17α-isopropylidenedioxy-Δ⁴-pregnene-3β,19,20β-triol,
The dicaproate of 17,20;20,21-bismethylenedioxy-Δ⁴-pregnene-3β,19-diol,
The dicaproate of 17,20;20,21-bismethylenedioxy-Δ⁴-pregnene-3β,19-diol-11-one,
The dicaproate of Δ⁴-22a-spirostene-3β,19-diol,
The 3,19-dicaproate of 17α-methyl-Δ⁴-androstene-3β,17β,19-triol,
The 3,19-dicaproate of 17α-ethinyl-Δ⁴-androstene-3β,17β,19-triol,
The 3,19,20-tricaproate of 16αmethyl-Δ⁴-pregnene-3β,17α,19,20β-tetrol,

16

The dicaproate of Δ⁴-androstene-17β,19-diol,
The 19-caproate of 17α-methyl-Δ⁴-androstene-17β,19-diol.

Example L

The starting compounds of Example XLIX were treated following exactly the procedure described in that example, except that caproic anhydride was substituted by acetic anhydride, propionic anhydride, enanthic anhydride and cyclopentylpropionic anhydride, thus affording respectively the corresponding acetates, propionates, enanthates, and cyclopentylpropionates of said starting compounds.

We claim:

1. A process for the production of 5α-halo-4β,19-oxido steroids selected from the group consisting of the androstane, pregnane and sapogenin series which comprises treating the corresponding 5α-halo-4β-hydroxy 19-unsubstituted compound with a positive halogen donor in a nonpolar organic solvent free from active hydrogen atoms.

2. The process of claim 1, wherein the halogen donor is selected from the group consisting of N-haloamides and N-haloimides of the following formulae:

$$R^9-\underset{\underset{O}{\|}}{C}-\underset{\underset{H}{|}}{N}-X^1, \quad R^{10}\underset{\underset{C}{\underset{\|}{O}}}{\overset{\overset{C}{\overset{\|}{O}}}{<}}N-X^1$$

wherein $R^9$ is a lower alkyl group; $R^{10}$ is selected from the group consisting of aromatic and aliphatic radicals of less than 8 carbon atoms; and $X^1$ is a halogen of atomic weight greater than 19.

3. The process of claim 2 wherein the reaction is carried out in the presence of iodine.

4. The process of claim 1 wherein the halogen donor is a hydrocarbon carboxylic acyl hypohalite of less than 12 carbon atoms.

5. The process of claim 4 wherein the acyl hypohalite is prepared in situ by the action of a metal hydrocarbon carboxylic acylate of less than 12 carbon atoms which on ionization produces a cation with a reduction potential larger than +0.3 v., with respect to its closest reduced state, on a halogen of atomic weight greater than 19.

6. The process of claim 5 wherein the metal acylate is lead tetraacetate and the halogen is iodine.

7. The process of claim 5 wherein the metal acylate is mercuric diacetate and the halogen is iodine.

8. The process of claim 5 wherein the metal acylate is silver acetate and the halogen is iodine.

9. A process for the production of a 19-hydroxy-Δ⁴-steroid selected from the group consisting of the androstane, pregnane and sapogenin series which comprises treating the corresponding compound selected from the group consisting of 5α-chloro-4β,19-oxido and 5α-bromo-4β,19-oxido steroids with a reagent selected from the group consisting of metals with an oxidation potential between +3.045 and +1.51 volts inclusive, in solvents free from active hydrogen atoms; metals with an oxidation potential between +1.5 and +0.126 volts inclusive, in lower aliphatic alcohols; metals with an oxidation potential between +1.5 and +0.126 volts inclusive, in liquid hydrocarbon carboxylic acids of less than 12 carbon atoms; salts which on ionization give cations with an oxidation potential between +0.61 and +0.25 volt inclusive, in lower aliphatic ketones; salts which on ionization give cations with an oxidation potential between +0.61 and +0.25 volt inclusive in lower aliphatic alcohols; metal iodides in lower aliphatic ketones, and metal iodides in lower aliphatic alcohols.

10. The process of claim 9, wherein the reagent is zinc in a lower aliphatic alcohol.

11. The process of claim 9 wherein the reagent is zinc in a liquid hydrocarbon carboxylic acid of less than 12 carbon atoms.

12. The process of claim 10 wherein the alcohol is ethanol.

13. The process of claim 11 wherein the acid is acetic acid.

14. The process of claim 9, wherein the reagent is zinc-copper couple in a lower aliphatic alcohol.

15. The process of claim 9, wherein the reagent is sodium metal in a solvent free from active hydrogen atoms.

16. The process of claim 9, wherein the reagent is chromous chloride in a lower aliphatic ketone.

17. The process of claim 9 wherein the reagent is sodium iodide in a lower aliphatic ketone.

References Cited by the Examiner

UNITED STATES PATENTS

| | | |
|---|---|---|
| 2,819,276 | 1/1958 | Michina _____ 260—387.4 |
| 3,065,228 | 11/1962 | Bowers _____ 260—239.55 |
| 3,067,198 | 12/1962 | Wettstein et al. ___ 260—239.55 |
| 3,077,482 | 2/1963 | Wettstein et al. ___ 260—239.55 |

LEWIS GOTTS, *Primary Examiner.*

ELBERT L. ROBERTS, HENRY A. FRENCH,
*Assistant Examiners.*